(12) United States Patent
Ramaswami et al.

(10) Patent No.: US 8,589,993 B2
(45) Date of Patent: Nov. 19, 2013

(54) DISTRIBUTING ON-DEMAND MULTIMEDIA CONTENT

(75) Inventors: Vaidyanathan Ramaswami, Branchburg, NJ (US); Rittwik Jana, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1045 days.

(21) Appl. No.: 12/201,826

(22) Filed: Aug. 29, 2008

(65) Prior Publication Data

US 2010/0058403 A1 Mar. 4, 2010

(51) Int. Cl.
*H04N 7/173* (2011.01)

(52) U.S. Cl.
USPC .......... 725/97; 725/86; 725/87; 725/89; 725/90; 725/91; 725/92; 725/93; 725/95; 725/96; 725/98; 709/204; 709/231

(58) Field of Classification Search
None
See application file for complete search history.

(56) References Cited

U.S. PATENT DOCUMENTS

| | | | |
|---|---|---|---|
| 5,517,232 A | 5/1996 | Heidemann et al. | |
| 5,534,912 A | 7/1996 | Kostreski | |
| 5,550,577 A | 8/1996 | Verbiest et al. | |
| 5,729,825 A | 3/1998 | Kostreski et al. | |
| 5,757,798 A | 5/1998 | Hamaguchi | |
| 5,764,893 A | 6/1998 | Okamoto et al. | |
| 5,864,537 A | 1/1999 | Hijikata et al. | |
| 5,905,942 A | 5/1999 | Stoel et al. | |
| 5,920,800 A | 7/1999 | Schafer | |
| 6,014,381 A | 1/2000 | Troxel | |
| 6,085,221 A | 7/2000 | Graf | |
| 6,211,901 B1 | 4/2001 | Imajima et al. | |
| 6,397,251 B1 | 5/2002 | Graf | |
| 6,434,748 B1 | 8/2002 | Shen et al. | |
| 6,553,355 B1 | 4/2003 | Arnoux | |
| 6,836,793 B1 | 12/2004 | Cesar et al. | |
| 7,257,831 B1 | 8/2007 | Ozawa | |
| 2001/0042113 A1 | 11/2001 | Cesar et al. | |
| 2003/0217366 A1 | 11/2003 | Takahashi | |
| 2004/0091109 A1 | 5/2004 | Son et al. | |
| 2006/0064536 A1 | 3/2006 | Tinker et al. | |
| 2006/0190615 A1* | 8/2006 | Panwar et al. | 709/231 |
| 2007/0016530 A1 | 1/2007 | Stasi et al. | |
| 2007/0056002 A1 | 3/2007 | Ganesan et al. | |
| 2007/0086364 A1 | 4/2007 | Ellis | |
| 2007/0101377 A1* | 5/2007 | Six et al. | 725/86 |

(Continued)

FOREIGN PATENT DOCUMENTS

WO WO 2007/148300 * 12/2007

*Primary Examiner* — Joshua Taylor
(74) *Attorney, Agent, or Firm* — Jackson Walker L.L.P.

(57) ABSTRACT

A disclosed method of distributing multimedia content to end users in a multimedia content distribution network includes segmenting time in a series of intervals referred to herein as limited-chain relay (LCR) intervals. The LCR intervals may have a duration of time T although an LCR interval may be terminated before the duration expires. During any interval, the LCR distribution method includes responding to a first request for a program of multimedia content (PMC) from a first requestor by delivering the PMC from a video server to the customer premises equipment (CPE) of the requestor and storing the PMC on the CPE of the first requestor. The method further includes responding to subsequent requests for the PMC that occur before the time T and before the interval terminates otherwise from subsequent requestors by delivering at least some portion of the PMC to the subsequent requestors from the CPE of at least one previous requestor.

20 Claims, 7 Drawing Sheets

(56) References Cited

U.S. PATENT DOCUMENTS

| | | |
|---|---|---|
| 2007/0143804 A1 | 6/2007 | Wang |
| 2008/0059631 A1* | 3/2008 | Bergstrom et al. ........... 709/224 |
| 2008/0071894 A1 | 3/2008 | Luss |
| 2008/0080392 A1* | 4/2008 | Walsh et al. .................. 370/254 |
| 2010/0241708 A1* | 9/2010 | Zuckerman et al. .......... 709/204 |

* cited by examiner

DISTRIBUTING ON-DEMAND MULTIMEDIA CONTENT

BACKGROUND

1. Field of the Disclosure

The disclosed subject matter is generally in the field of multimedia content distribution networks and services and, more particularly, distributing on-demand content in such networks.

2. Description of the Related Art

Multimedia content distribution networks encompass conventional cable, satellite, and packet-switched networks including peer-to-peer networks. The bandwidth required to transmit multimedia content can be especially taxing on bandwidth limitations inherent in all content distribution networks. Existing techniques for distributing on-demand content and other types of multimedia content include multicasting, unicasting, distributed caching, and peer-to-peer striping.

DESCRIPTION OF THE EMBODIMENT(S)

Figure 1:
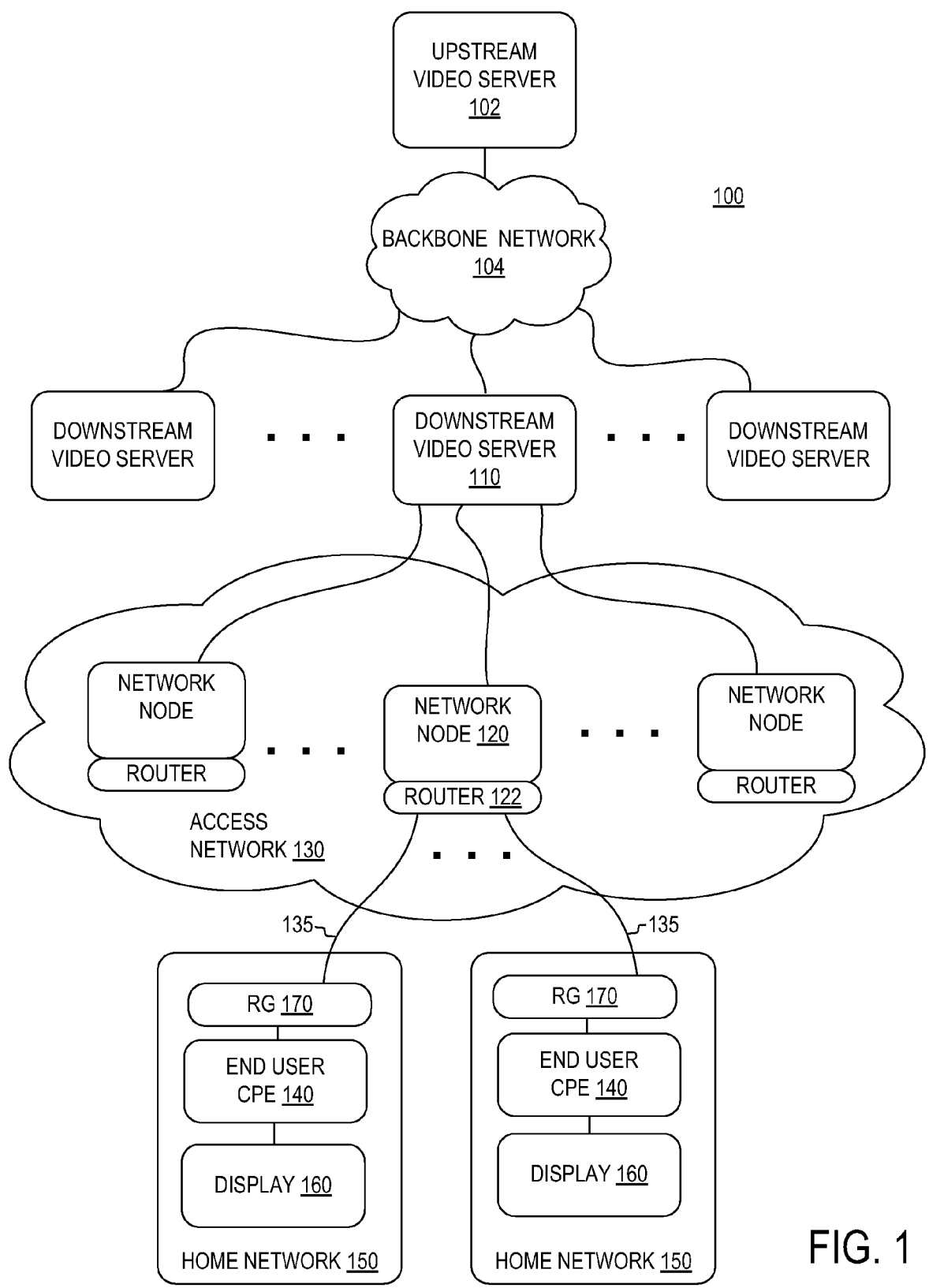
FIG. 1 is a block diagram of selected elements of an embodiment of a multimedia content distribution network.

Information distribution techniques disclosed herein are exemplified and illustrated in the context of distributing multimedia content including video on demand (VOD) content over a wide area broadband network, some or all of which may be an Internet protocol (IP) network. Described techniques are applicable to a variety of network architectures including fiber-to-the-home, fiber to the curb, digital subscriber line (DSL), etc. The disclosed distribution techniques, which may be referred to herein collectively as LCR distribution, provide a potentially beneficial alternative to unicasting, multicasting, caching, and peer assisted networks.

The disclosed embodiments of LCR distribution may reduce or conserve link capacity utilization and video server processing demands of a video server. The disclosed LCR distribution may also result in robustness with respect to forecasting uncertainties and reduced storage requirements for a user's CPE. Still further, LCR distribution as disclosed herein offers decreased susceptibility to node failures, ease of bootstrapping or setting up, and re-creation in the event of failures. LCR distribution may also facilitate centralized administration that aids billing and other Operations Support functions.

LCR distribution is not limited to multimedia content distribution or to distribution over IP networks. LCR distribution concepts disclosed herein can be applied to other types of services, including, as examples, file transfer and audio broadcasting and to other types of networks, including, for example, a mobile network. LCR distribution may, encompass an ad-hoc network, for example, a collection of mobile users in a football stadium sharing a video with one user serving as a controller.

LCR distribution is distinguishable from various conventional distribution techniques. In a conventional unicast content distribution scheme, for example, each request for content is treated independently of all others, and a video server transmits video content to each end user separately. Since end users are not synchronized with respect to their start times, a pure unicast scheme requires transmitting the same content repeatedly. Unicasting is characterized by high video server bandwidth consumption and high processing demands on the video server.

In a conventional multicasting implementation, content is distributed simultaneously to multiple end users. Multicasting may occur at a video server, a network node that is hierarchically "downstream" of a video server, or both. Requests for content are batched so that all end users receiving multicast content have a synchronized starting point in time. This batching may result in a start up delay for the end users.

Conventional caching schemes pre-distribute content to a multitude of nodes. When a user makes a request, content is retrieved from a convenient caching node. The efficacy of caching implementations depends heavily on the ability to predict not only what content users will request, but also the pattern of demand.

In conventional peer assisted schemes, content is "chunked" (divided into pieces) and the chunks are distributed among a set of peers. Content is delivered by retrieving chunks from other peers. As is true in caching schemes, however, the very large number of content selections available in a typical commercial video server precludes the chunking of all content. Judicious selections of the content to be chunked, the size of chunks, the peers on which to store the chunks, etc. have to be made, and overall efficiencies achieved depend heavily on the accuracy of demand forecasts.

Embodiments of LCR distribution disclosed herein greatly reduce the importance of forecasting demand for and popularity of content. LCR distribution reduces video server processing and bandwidth by serving content to at least some end users without involving a video server in the actual transfer of content. Instead, downstream network nodes having routing capability permit content transfer among end users connected to it. In such configurations, an end user that has requested and received content can store the content locally and provide the content to a subsequent requestor of the content. Multicasting capabilities can be incorporated into downstream network elements to further facilitate bandwidth conservation. Generally, without regards to the number of hierarchical levels of nodes that a network may have, LCR distribution as disclosed herein shifts responsibility for content delivery from upstream nodes to one or more downstream nodes.

Some aspects of LCR distribution are illustrated using a hypothetical example in which an end user's set top box or other suitable form of CPE has an uplink bandwidth that equals the minimum rate at which multimedia content must be downloaded to produce smooth streaming. In an exemplary implementation, time is segmented into intervals of equal length of T minutes. T is a tunable parameter that can be made to depend on demand factors such as historical or estimated frequency with which the content has been or will be sought.

During an interval of time [0,T], CPE1 represents the first end user device that requests a particular program of multimedia content (PMC). The video server responds to the CPE1 request by downloading or otherwise transmitting the PMC to CPE1. CPE1 stores the downloaded content locally. If a subsequent request for the PMC is made by a second CPE device (CPE2) in the interval [0,T], at least some portion of the PMC is provided to CPE2 from CPE1 via a downstream network node, i.e., a network node that is hierarchically downstream of the video server. By delivering content between end users through a network node that is downstream of the video server, the video server does not participate in the actual delivery of multimedia content to CPE2. The video server might, in some embodiments, issue messages or signals including, as examples, messages to initiate the process, create appropriate billing records, monitor for quality purposes, and so forth. In some embodiments, the network node that routes the content transfer between end users may be a central office node or a digital subscriber line access multiplexer (DSLAM) node.

Each subsequent request for the PMC that occurs during the interval [0, T] is served by the CPE of a preceding requestor. Once the time interval T expires, a new interval begins and the process starts over. Using the time interval T and the described chaining, the frequency at which a video server would have to distribute any particular PMC to an end user or other downstream node is 1/T, barring a link failure or the like. If T=5 minutes, for example, the video server will have to distribute the PMC no more than once every five minutes or twelve times per hour irrespective of the total number of content requests that occur in that hour.

Time intervals are also beneficial in limiting the number of end users affected if a link failure occurs. Recovery can occur by requesting the video server to resume from the appropriate frame. Various recovery techniques including both unicast and multicast may then be employed.

The length of each content request "chain" in the foregoing discussion equals the number of PMC requests that occur during the interval. In some embodiments, however, chain length is deliberately controlled. For example, some embodiments may terminate the current time interval and force a new chain to start whenever the existing chain length reaches a predetermined number N.

It is not inconceivable that CPE uplink capabilities may increase significantly and CPE uplink rates might, at some point, exceed the rate required to serve multimedia content. In such a situation, during any interval [0,T], CPE1 may serve content to multiple subsequent requestors until its uplink capacity is exhausted. The CPE of a subsequent requester would then take over as the source for successive requestors, and this process continues for the duration of the interval.

In any of these implementations, redundancies can be employed by maintaining several end user CPEs as potential content suppliers so that the failure of one does not interrupt chaining. The disclosed LCR distribution, in addition to conserving video server bandwidth consumption, also reduces video server processing overhead. Thus, the benefits of LCR distribution are not limited to conservation of scarce bandwidth, and LCR distribution may be beneficial even in bandwidth rich environments.

When CPE uplink rates are less than the rate required for a multimedia content delivery, the CPE of the first requester (CPE1) cannot, by itself, provide content to the CPE of a subsequent requester (CPE2) at a sufficient rate. In this situation, multiple CPEs are needed for delivering content to subsequent requestors if the assistance of the video server is to be avoided. Additional CPEs, referred to herein as "helper CPEs" or, more simply "helpers", are needed to deliver content. Helpers refer to CPEs that did not request the content themselves, but are conscripted by the service providers to facilitate LCR distribution. The use of helpers leverages the potentially large pool of CPE uplink bandwidth by recognizing that CPE uplinks are often underutilized. Some end users may rarely, if ever, fully utilize their uplink capacity while other end users may upload significant amounts of data from time to time, but may use little or no uplink capacity during long periods of time, e.g., during working hours in the case of a CPE in the user's home. Helper CPEs may be selected from a pool of available CPEs using any of various selection algorithms including as examples, least average link usage, longest idle time on uplink usage, least recently used, etc. In other embodiments, subscribers may receive incentives to increase the availability of their CPE to be available as helpers. Subscribers who make their CPE highly available as helpers, for example, might receive reduced billing or another suitable form of incentive. Although the embodiments described herein emphasize the use of CPE for the helpers, other embodiments may conscript other types of network aware devices as helpers including, as examples, wireless devices such as cellular telephones, smart phone, PDA's and so forth.

To illustrate the use of helpers, consider the example wherein CPE1 is the first requester of a PMC during an interval [0, T] and the uplink capacity of CPE1 is below that needed to deliver multimedia content. The request from CPE1 causes the video server, or another network element executing an LCR distribution application, to select one or more helpers from a pool of available helpers. In this example, a single helper, H1, is assumed. The video server then downloads or otherwise delivers the PMC from the video server to CPE1 and to the helper H1. The delivery of the PMC to the requesting CPE and the helper(s) can be performed as a multicast delivery thereby saving the video server additional bandwidth consumption. When a subsequent request for the PMC is generated within the LCR interval [0,T] by the CPE of a second subscriber or other end user (CPE2), a second helper is selected, H2, and at least some of the PMC is delivered to CPE2 and H2 from CPE1 and H1, which together, have adequate uplink bandwidth to deliver multimedia content. The chain continues up to time T with each new arrival CPE(n+1) being served by the pair (CPE(n), H(n)) and generating a new helper H(n+1). The method is extensible to encompass scenarios in which two or more helpers are required to achieve adequate bandwidth.

The CPEs in the helper pool may be maintained based on usage statistics to enhance the probability that a CPE conscripted as a helper has sufficient resources during its service as a helper. Thus, the choice of the number of helpers and the specific CPEs that are used as helpers may be made dependent on uplink/downlink usage statistics in a way that the helpers have a high chance of having the necessary uplink and downlink capabilities for uninterrupted chaining.

In embodiments desirable for their flexibility, the LCR distribution parameters including LCR interval duration (T) and maximum chain length (N) may be made to depend on the popularity of and demand for the applicable content. Highly popular content might have smaller values of T, N, or both than less popular content. Moreover, information on the popularity and demand for the content may be gathered in real time based on current usage data.

In some embodiments, each requester for the PMC within a given interval after the first requester may join the ongoing multicast immediately upon arrival and obtain the missed content from the immediately previous requester and any helpers associated with that previous requester. Furthermore, when the current requester is caught up with the missed content, the helpers associated with the previous requester may be released to the helper pool. Recycling of helpers as soon as possible can help to improve the size of the available helper pool.

In these implementations, helpers need not store the entire PMC content. Since helpers in this scenario need to store, at most, a content segment of length T, it is enough to maintain a cyclic buffer of a size proportional to T at each helper. It is also worth noting that a helper's activity may persist across interval boundaries. A helper enlisted at a point in time very close to the end of an interval T will continue to deliver content to the requester beyond the end of the current interval but a helper's service time is always limited by 2T.

During the handling of all content requests, LCR distribution may enlist more than the minimum required number of helpers. The additional helpers may later be used to provide redundancy in the event one or more active helpers fail.

In each of the above scenarios, an end user sends a request for a PMC to a video server through a network node. The video server determines if the request should start a chain, i.e., if the request is a first request of the current LCR interval, and, if so, the video server sends the PMC by starting a multicast to the end user's CPE and those of any associated helpers. If the requester is not the first requester in the interval, then the video server may select helpers as needed from the helper pool and send signals to or otherwise control the previous requester and any helper(s) to send content to the new requester and any helper(s). In this manner, content is made to flow from one member of the chain to the next member in the same chain.

The network need not use an identical scheme for all video content. As noted earlier, all parameters of implementation can be made content dependent and governed by statistics governing their usage. LCR distribution may be combined with other distribution techniques. For example, an embodiment might use a multicast scheme for extremely popular content and LCR distribution for other content.

If the set up time required to add a new requester to an existing chain is large, some embodiments may cause the video server to burst a portion of the content to the new requester so that the new requester need not wait to start viewing. When the new requester set up is completed, content delivery occurs via an LCR chain and the video server is relieved of supplying further content. Some embodiments may learn "on the fly" whether certain content is in high demand. Some embodiments may add a condition that when the number of invocations of a specific PMC within an interval exceeds a predetermined threshold or when the pool of available helpers dwindles below a certain threshold, the network may switch to a multicast state. Hysteresis can be built into the process by setting a higher threshold at which LCR distribution is restored. In this manner, the disclosed distribution technique dynamically adapts to demand and is not dependent on forecasting accuracy. Rarely requested content is efficiently handled since a helper created during a particular LCR interval will not likely be called upon to supply content in the same interval, in which case the helper can be released when the interval ends.

If a subscriber or other user elects not to participate in supplying content to subsequent users, then helpers alone might be used supply content to subsequent requests. LCR distribution can be employed in a streaming video situation where the buffer at the viewer/helpers who become video sources for immediately next requests is limited to a finite interval T so that streaming can occur but they cannot buffer the entire content.

LCR distribution may find applications in other networks and for other services. For example, a set of mobile users who wish to receive content from someone may form an ad-hoc chain via an ad-hoc node which serves to transfer content between chain members.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

In one aspect, a disclosed method of distributing multimedia content to end users in a multimedia content distribution network includes segmenting time in a series of intervals referred to herein as LCR intervals. The LCR intervals may have a duration of time T although an LCR interval may be terminated before the duration expires. During any interval, the LCR distribution method includes responding to a first request for a PMC from a first requester by delivering the PMC from a video server to the CPE of the requester and storing at least the first T units of the PMC on the CPE of the first requester. The method further includes responding to subsequent requests from subsequent requestors for the PMC that occur before the time T and before the interval terminates otherwise by delivering at least some portion of the PMC to the subsequent requesters from the CPE of at least one previous requester.

The current LCR interval may be terminated if the number of subsequent requests that are received during any given LCR interval exceeds a predetermined threshold N. In some embodiments, values for T and N are altered by an administrator or user in response to excessively terminating current LCR intervals. The disclosed method may include selecting T, N, or both based on the demand for the PMC. Delivering at least some portion of the PMC from a CPE of a previous requester may include routing the PMC from the previous requester through a network node to a current requester. The network node edge may comprise a DSLAM.

A connection between the CPE of the requester and the downstream network node may include a downlink for downloading data to the requester CPE and an uplink for uploading data from a CPE to a subsequent requester. When the bandwidth capacity of the uplink is less than a predetermined threshold, such as a predetermined bandwidth capacity sufficient to stream multimedia content without substantial interruption, selecting the number of helper CPEs is based at least in part on the bandwidth capacity and delivering at least a portion of the PMC from the multimedia server to the helper CPEs, possibly as part of a multicast transmission. In this embodiment, responding to subsequent requests may further include delivering at least a portion of the PMC from at least some of the helper CPEs associated with a previous requester to a current requester. In some embodiments, the determination of whether helpers are needed and, if so, how many helpers are needed may be performed by a network node that manages LCR activity. In other embodiments, it may be possible for the CPE to assist in the helper evaluation process. For example, a CPE may be able to provide more accurate statistics regarding its uplink capacity than a network node.

The disclosed method may further include maintaining a pool of potential helper CPEs and selecting at least one helper CPE from the pool. In this embodiment, selecting at least one helper CPE may be based, at least in part, on expected utilizations of uplinks of the helper CPE or another parameter. In some embodiments, a maximum uplink capacity of the CPEs is M and an uplink capacity required to deliver multimedia content is K and the number of helper CPEs is determined, at least in part, from the values of M and K. For example, the minimum number of helper CPEs may be greater than or equal to K/M−1 in some embodiments.

The number of selected helper CPEs may exceed the minimum and, in these situations, at least some of the selected helper CPEs may be used to provide redundancy in the event of a failure of another helper CPE. The PMC may be delivered to the requester and to the helper CPEs by multicasting the PMC to the requester and the helper CPEs simultaneously. Helpers may be re-cycled or re-used so that at least one of the selected helper CPEs is used as a helper CPE during multiple subsequent requests. The helper CPEs may store only a portion of the PMC.

In some implementations, the method may respond to the subsequent PMC requests by delivering a first portion of the PMC from the helper CPEs associated with a previous helper to a current requester and delivering the remaining portion of the PMC from the video server. For example, subsequent requests may be serviced by delivering from the previous requester the PMC "delta," i.e., the portion of the PMC that transpired between the first request in an interval T and the most recent request and, thereafter, making the current requester part of a multicast group that is receiving the PMC from the video server. In these embodiments, the helper CPEs need only store a small portion of the PMC, e.g., no greater than T in duration, and, once that small portion has been delivered to a subsequent requester, the helper CPE may be returned to the helper pool.

When the bandwidth capacity of the uplink is greater than a predetermined threshold, responding to a plurality of subsequent requests for the PMC from subsequent requesters may include delivering at least some portion of the PMC from a CPE of a previous requestor.

In another aspect, a disclosed CPE suitable for use in a multimedia content distribution network, includes a processor and a computer readable storage medium accessible to the processor. The depicted CPE includes a network interface for receiving multimedia content from an access network and a decoder for processing multimedia content received via the network interface.

The computer readable storage includes embedded instructions comprising an LCR application, the LCR application enabling the CPE to generate a first request for multimedia content and send the first request to a video server via a network node. The video server then receives the requested multimedia content from the video server. If a subsequent request for the PMC is received before the end of a current duration or interval, a signaling message indicating a subsequent request for the multimedia content is delivered to the end box. In response to receiving the signaling message, the CPE may deliver at least a portion of the downloaded PMC to a subsequent requestor.

If an uplink capacity of a connection to the CPE is less than a predetermined capacity necessary to sustain video content delivery, the CPE may be configured to respond to the subsequent request by delivering at least a portion of the PMC to CPE associated with the subsequent requester and at least one subsequent helper. The determination of the need for helpers and for how many helpers may be made by a network node, with or without the assistance of the CPE.

In another aspect, a disclosed downstream network node (DNN) 120 or other network resource includes processor and processor accessible storage. The network resource may be the Video Hub Office (VHO), but it may also be a DNN, such as a DSLAM, Central Office, or an adjunct resource connected to the DSLAM or VHO. Embedded in the storage is at least a portion of an LCR distribution application. The application includes instructions to determine a beginning and ending of successive LCR time intervals and, responsive to detecting a first request of a current LCR time interval, wherein the first request is for a PMC, delivering a least a portion of the PMC to a CPE of the requestor. Responsive to detecting a second request of the current LCR time interval, wherein the second request is also for the PMC, signaling the CPE associated with the first request to send at least a portion of the PMC from the first CPE to a second CPE associated with the second request. If the network node containing or executing the LCR distribution application is not the VHO, the network node would also instruct the VHO on where to deliver the initial multicast. The network node would also determine whether helpers were needed and, if so, how many, and if so, which helpers would be assigned to each request.

Referring to FIG. 1, selected elements of an embodiment of a multimedia content distribution network 100 suitable for employing LCR distribution are depicted. In the depicted embodiment, multimedia content distribution network 100 exhibits a hierarchical architectural arrangement with an upstream video server (UVS) 102 residing at the hierarchical "top" of network 100. UVS 102 encompasses resources to acquire, process, and transmit linear programming broadcast content and VOD content. As depicted in FIG. 1, UVS 102 represents the primary acquisition and aggregation resource for national interest programming. In some embodiments, UVS 102 serves as a Super Headend Office (SHO).

UVS 102 may distribute acquired content over a backbone network 104 to one or more downstream video servers (DVSs) 110. DVSs 110 represent video distribution points within each designated market area (DMA). In some embodiments, each DMA may be served by a corresponding DVS 110. In some embodiments, UVS 102 unicasts or otherwise transmits VOD content to all DVSs 110. DVSs 110 may also include their own content acquisition resources (not depicted) and DVSs 110 may serve as acquisition resources for regional or local content including advertising, local broadcast channels, municipal channels, etc. In some embodiments, a DVS 110 may be implemented as a VHO.

The depicted embodiment of network 100 further illustrates network nodes, referred to herein as DNNs 120 located downstream of DVSs 110, between DVSs 110 and end user CPE devices referred to herein as CPEs 140. The physical network connecting CPEs 140 to a DNN 120 is referred to as the access network 130, which includes "last mile" links 135. Last mile links 135 may include DSL-compliant unshielded twisted pair copper, fiber optic cables, or a combination of both. Other embodiments of network 100 may employ intermediate offices (not depicted) between DNNs 120 and DVSs 110 to reduce the number of direct connections to any DVS 110.

In some embodiments of LCR distribution as disclosed herein, DNNs 120 include packet routing capability such as the packet routing capability that would be found in a conventional router of an IP-based network. In these embodiments of DNNs 120, multimedia content may be transferred between network elements that are downstream of DNNs 120 including, for example, between CPEs 140, without invoking media delivery services of DVS 110 or any network element upstream of DVS 110. DNNs 120 as depicted in FIG. 1 include packet routing resources or routers 122 that support packet routing.

Depending upon the implementation, an DNN 120 may represent a central office (CO) or a DSLAM connected to a CO. In a DSLAM implementation of DNN 120, the DSLAM may include packet routing resources 122. In other embodiments, the packet routing capability 122 comprises a portion of a CO 210. In either of these embodiments, communication between CPEs 140 consumes bandwidth and resources downstream of CO 210, but still does not consume bandwidth or resources upstream of CO 210.

In embodiments that employ a fiber-to-the-home access network 130, DNN 120 may represent a CO and last mile link 135 may represent a passive optical network (PON) that connects directly to an end user's CPE 140. Alternatively, in a fiber to the node (FTTN) deployment, fiber connections connect the COs with the DSLAMs while unshielded twisted copper pairs connect the DSLAMs to the CPEs. For purposes of the LCR distribution disclosed herein, the DNN 120 represents that most-downstream network node that incorporates routing resources 122, whether that node is a CO, a DSLAM, or another type of network node.

CPEs 140 as depicted in FIG. 1 represent an element of a home network 150 portion of multimedia content distribution network 100. In the depicted embodiment, home network 150 includes a residential gateway (RG) 170 including a DSL modem suitable for use in FTTN implementations of access network 130. In fiber to the premises (FTTP) implementations of access network 130 (not depicted) home network 150 may include an optical-to-Ethernet network termination (ONT).

RG 170 provides a managed interface between CPE 140 and services delivered over the network infrastructure. RG 170 may also implement a session initiation protocol (SIP) client for voice over IP (VoIP) service. RG 170 may terminate the broadband connection and route traffic to local area network (LAN) devices on the premises. IP services in the home may be accessed via RG 170. Networking within the home may use different technologies including, as examples, Ethernet over COAX (MoCA), Ethernet over Home Phone-line Network Alliance (HPNA), wired (802.3), and wireless (802.11a/b/g).

The bandwidth available on each last mile link 135 is dependent upon the implementation. In an FTTN implementation as shown in FIG. 1, assuming RG 170 has sufficient disc space (e.g. in the order of 100 Gbytes), typical multimedia streaming rates are 2 Mbps for standard definition (SD) and 6.5 Mbps for high definition (HD). A VOD asset must be streamed at a minimum of the SD rate. A DSLAM supports up to 200 homes. The further a home is from the DSLAM the lower its observed bandwidth. Implementing a configuration that supports two HD channels, two SD channels, one high speed internet data channel (6 Mbps) and one VOIP channel (2 Mbps) can be accommodated with a 25 Mbps link.

In some embodiments, video services are provided by end user CPE 140. CPE 140 may represent a standalone set top box (STB) connected to television or display device 160. In other embodiments, CPE 140 may be integrated into RG 170 and/or display 160. CPE 140 processes multimedia content and renders the content for display on display 160.

An example representative of the above architecture is AT&T's U-Verse service where a VHO serves a set of CO's off which hang several DSLAMs. Each DSLAM serves a multitude of homes, each of which has a STB connected to one or more television sets. In the AT&T architecture, videos are transmitted to the DSLAM over fiber and then by the DSLAM to the home STB using asymmetric digital subscriber lines (ADSL) over a twisted pair of copper. The transmission to the home occurs over a downlink data channel (Down Link), while requests for video and other control data are sent from the home STB to the VHO via an uplink channel (Up Link). The downlink is shared by a variety of applications such as broadcast video, VOD, and data. The uplink is similarly shared by various control data (for example VOD requests) and user data (data, still pictures, user's video clips, etc.)

Specific challenges in the arena of video distribution are the available uplink and downlink capacities and rates in the access portion of the network. This is the section of the network between the video server and the CPE. In most architectures, including U-Verse, the uplink rate is significantly smaller than the downlink rate.

In addition to the link constraints, some embodiments consider the available storage capacity and other storage restrictions at the digital video recorder (DVR) which may be used by the customer for recording both broadcast video as well as VOD content. Disclosed content distribution techniques may also use that recording capacity to support other customers' needs for the content. Depending on the implementation and subject to copyright restrictions, either all or only a portion of the content could be stored in CPE. Thus, disclosed content distribution techniques encompass content distribution approaches that do not permit or necessarily require the receiver to store the entire content.

Figure 2:
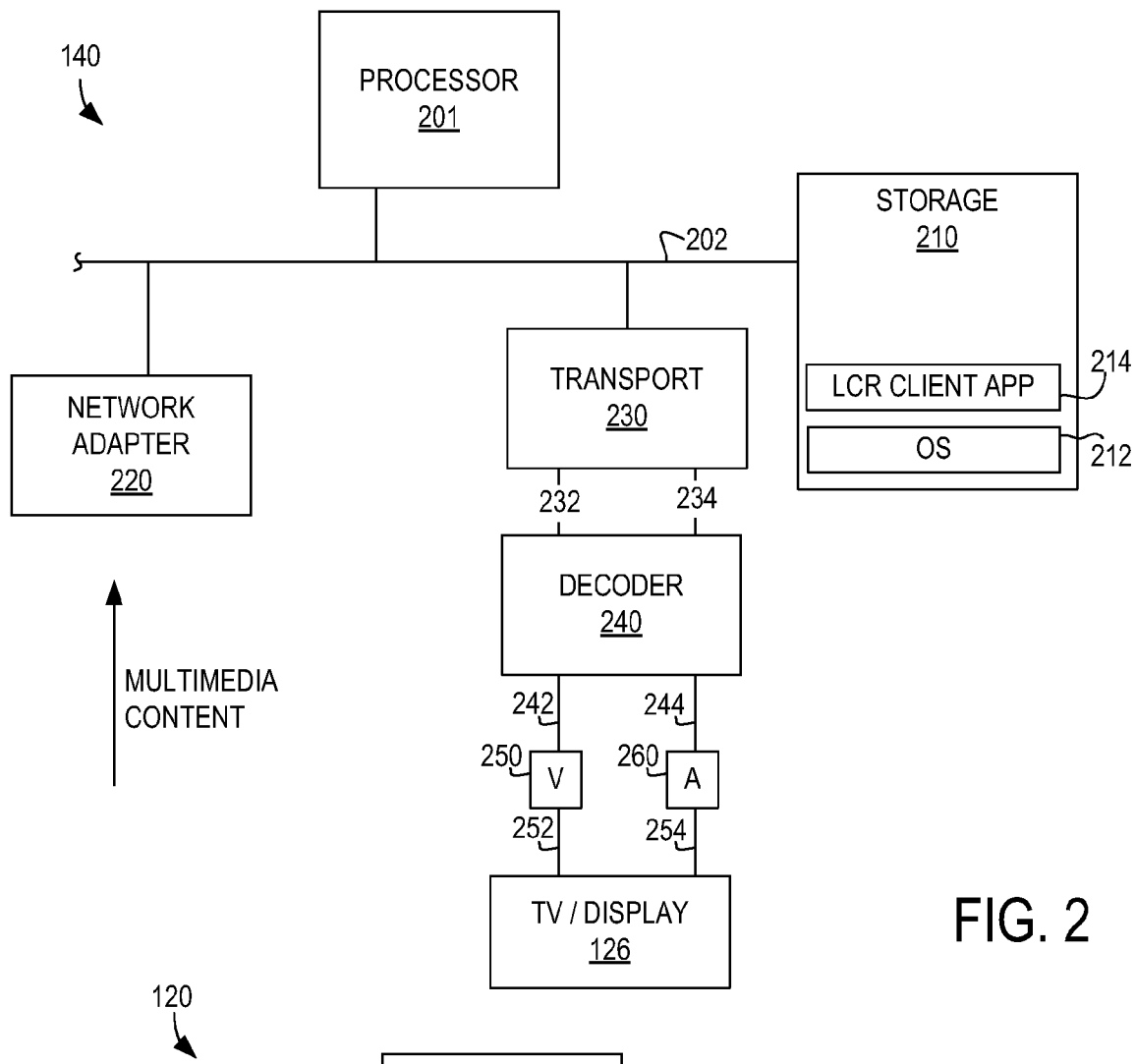
FIG. 2 is a block diagram of selected elements of an embodiment of a customer premises equipment (CPE) device.

Referring now to FIG. 2, a block diagram illustrating selected elements of an embodiment of CPE 140 is presented. In the depicted embodiment, CPE 140 includes a processor 201 coupled via a shared bus 202 to storage media collectively identified as storage 210. Processor 201 may be a general purpose microprocessor such as an x86 type processor. In other embodiments, processor 201 may be implemented with any of various, commercially distributed embedded processors. Storage 210 encompasses persistent and volatile media, fixed and removable media, and magnetic and semiconductor media. Storage 210 is operable to store instructions, data structures, or both. Sets of instructions stored in storage 210 may be referred to as computer programs, application programs, software, and other terms that will be familiar to skilled artisans. Moreover, although storage 210 is shown in FIG. 2 as an element of CPE 140, storage 210 may include portions that are distributed, network hosted, or otherwise remotely located from CPE 140.

CPE 140 as depicted in FIG. 2 further includes a network adapter 220 through which CPE 140 receives multimedia content. In embodiments employing IP-based access networks, multimedia content may be delivered to CPE 140 as a series of IP-compliant packets. In other embodiments, including digitally modulated cable-based embodiments of access network 130, multimedia content may be modulated into a particularly frequency band and transported simultaneously with multimedia content from other "channels," which are modulated into their own respective carrier bands.

CPE 140 as shown includes a decoder 240. Multimedia content may be digitally compressed, encrypted, modulated, packetized, or otherwise formatted as it is received from access network 130. Decoder 240 is configured to process incoming multimedia content to generate a native format video stream 242 and audio stream 244. For use with IP based implementations of access network 130, decoder 240 may include transport/demultiplexing resources 230 to convert a series or set of IP-compliant packets into a video stream 232 and an audio stream 242. For use with cable based embodiments of access network 130, decoder 240 may include one or more tuners to extract a desired stream of multimedia content by filtering a desired frequency band.

Decoder 240 is further configured to decrypt, descramble, and/or decompress multimedia content to generate native format video stream 242 and audio stream 244. The decompression performed by decoder 240 may comply with any of various video compression/decompression algorithms including, as examples, algorithms suitable for use with any of the H.264, Motion Pictures Expert Group (MPEG), or Windows® Media Video (WMV) compression formats including, as examples, MPEG-2, MPEG-4 and WMV 7, WMV 8, and WMV 9. Similarly decoder 240 may employ any of various audio decoding algorithms including Dolby® Digital, Digital Theatre System (DTS) Coherent Acoustics, Advanced Audio Coding (AAC), MP3, and Windows Media Audio (WMA).

The native format video and audio streams 242 and 244 as shown in FIG. 2 may be processed by encoders/digital-to-analog converters (encoders/DACs) 250 and 260 respectively to produce analog video and audio signals 252 and 254 in a format compliant with display 126. Display 126 may comply with a National Television Systems Committee (NTSC), Phase Alternating Line (PAL), or any other suitable television standard.

Storage 210 as shown in FIG. 2 includes software in the form of an operating system 212 and a LCR client application (LCR Client App) 214. Operating system 212 may represent a Unix or Unix-like operating system, a Windows® family operating system, or another suitable operating system. In some embodiments, LCR Client App 214 includes instructions that, when executed, cause two or possibly more CPEs 140 to deliver multimedia content from at least one of the CPEs 140 to at least one other of the CPEs 140. In some embodiments, the delivery of multimedia content takes place entirely over a portion of network 100 that is downstream of DNNs 120.

Figure 3:
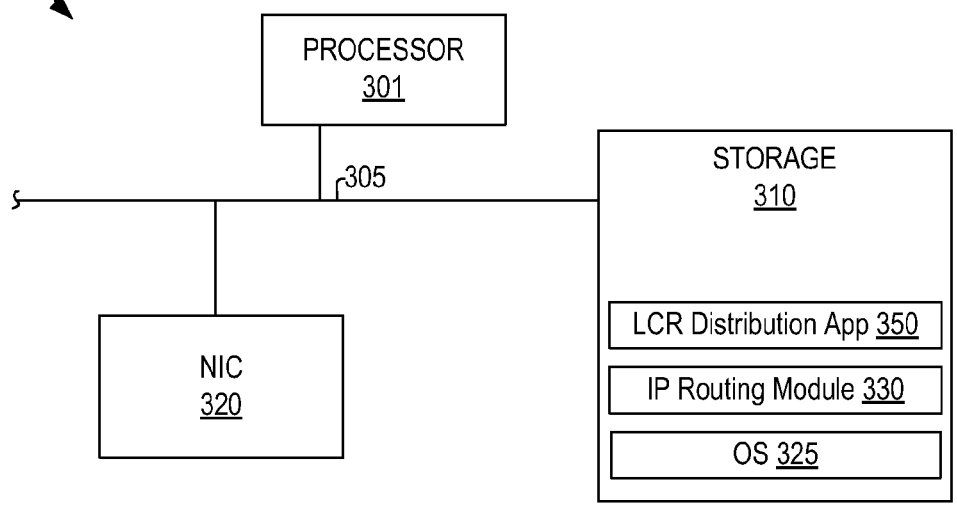
FIG. 3 is a block diagram of selected elements of an embodiment of a network node.

Referring to FIG. 3, selected elements of an embodiment of DNN 120 are illustrated. In the depicted embodiment, DNN 120 includes a processor 301, storage media identified as storage 310, and a network interface adapter or NIC 320. In the depicted embodiment, processor 301 and NIC 320 connect to a shared bus 305 that provides access to storage 310. Storage 310 encompasses persistent and volatile media, fixed and removable media, and magnetic, optical, and semiconductor media. Storage 310 may include database structures, processor executable instructions, or both. The instructions embedded or otherwise stored in storage 310 as depicted in FIG. 3 include an operating system 325 and an LCR Distribution Application 350. Operating system 325 may be a Unix-based or Unix-like operating system, a Windows® based operating system, or another type of operating system. Although LCR Distribution Application 350 is depicted as residing in storage 310 on DNN 120, all or portions of LCR Distribution Application 350 may be stored on, downloaded to, and/or executed on another network resource including DVS 110, UVS 102, or elsewhere. DNN 120 as depicted in FIG. 3 further includes an IP routing module 330 suitable for implementing an IP compliant routing mechanism.

Figure 4:
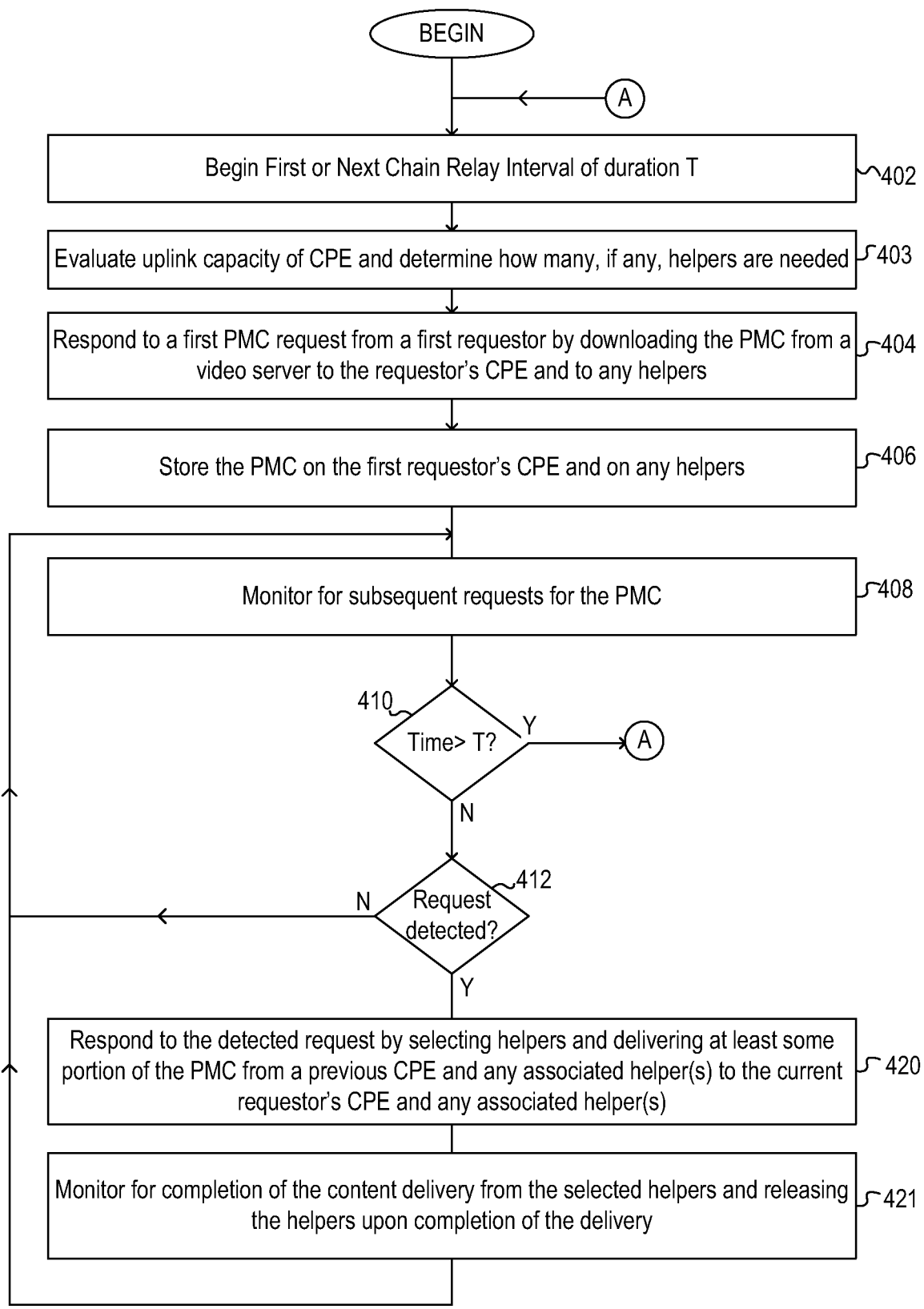
FIG. 4 is a flow diagram of selected elements of an embodiment of a method of distributing multimedia content.

Referring now to FIG. 4, a flow diagram depicts selected elements of an embodiment of a method 400 of distributing multimedia content. Method 400 as depicted in FIG. 4 emphasizes LCR distribution of multimedia content with or without the use of helper CPEs. In some embodiments, method 400 is illustrative of computer executable instructions that are stored in or otherwise embedded in a computer readable medium such as the computer readable medium of a network node 120 or other network resource suitable for managing LCR chaining.

Method 400 as shown segments time into intervals of a predetermined duration (T). Method 400 is an iterative method that repeats on each successive interval. The time intervals may be referred to herein as LCR intervals.

In block 402, an initial or a subsequent time interval of duration T is begun. As part of the start of a new time interval, method 400 includes evaluating (block 403) the uplink capacity to determine whether helper CPE devices are going to be necessary to achieve adequate bandwidth for chain relaying distribution. In some embodiments, link capacity is evaluated only after receiving a request for content. These embodiments have the benefit of knowing precisely which CPE is being employed and the uplink evaluation may occur on the CPE of interest. In other embodiments, the uplink capacity is evaluated based on an exemplary or typical CPE. The uplink evaluation may return information including information indicative of how many helpers might be needed. Additional details of the uplink evaluation 403 are described below with respect to FIG. 5.

After initializing the time interval and evaluating the CPE link capacity, the depicted embodiment of method 400 includes detecting a first end user request for a specific PMC and, in response, downloading (block 404) the PMC from a video server to the requestor's CPE and storing (block 406) the downloaded PMC.

If method 400 determines in block 403 that helpers would be needed to support LCR distribution of multimedia content, block 404 would include selecting any needed helpers from a pool of available helpers and delivering at least some portion of the PMC to the helpers. When helpers are involved in the LCR distribution, delivering a PMC to a requesting CPE and to one or more helpers may include multicasting the PMC to the requestor and the helper(s).

After servicing the initial request for content, the depicted embodiment of method 400 includes monitoring (block 408) the CPEs 140 for a subsequent content request. If (block 410) the current LCR interval expires before a subsequent request is detected, method 400 jumps back to block 402 where a new interval is initiated. If, in block 410, the current LCR interval has not expired, method 400 determines (block 412) whether a subsequent request for the PMC has been detected. If a subsequent request has been detected, method 400 responds to the subsequent request in block 420 by selecting helpers, if necessary, and delivering at least some of the PMC from a previous CPE and from any helpers that were associated with the previous requestor's CPE. It should be noted that different resources may send content at different rates to the next successive requestor. Thus, for example, a CPE receiving content from the previous requester and two helpers may obtain 70% of the content from the first helper, 20% from the second helper, and 10% from the previous requestor.

In block 421, method 400 monitors for the completion of the delivery of content by helpers associated with a previous requester and, when delivery is complete, releasing the applicable helpers back into the helper pool where they are available to help subsequent requesters. By releasing and recycling helpers as soon as possible, i.e., as soon as they have delivered the necessary content to the current requester, the depicted embodiment may be able to operate with fewer total helpers than otherwise.

The delivery of multimedia content in block 420 from one CPE, whether it be a requester or a helper, to another CPE occurs over downstream portions of network 100. Specifically, referring back to FIG. 1, intra-CPE content delivery occurs on portions of network 100 that are downstream of video servers 102 and 110. By delegating content transfer to downstream portions of network 100, LCR distribution of content beneficially conserves bandwidth and processing resources of the video servers thereby enabling the video servers to serve a greater number of content requests at lower processing overhead. In some embodiments, LCR distribution of content between CPE devices may still require administrative participation of a video server. For example, a video server may be required to respond to subsequent content requests by coordinating messages to the network nodes and CPEs to facilitate the intra-CPE content transfer.

Figure 6:
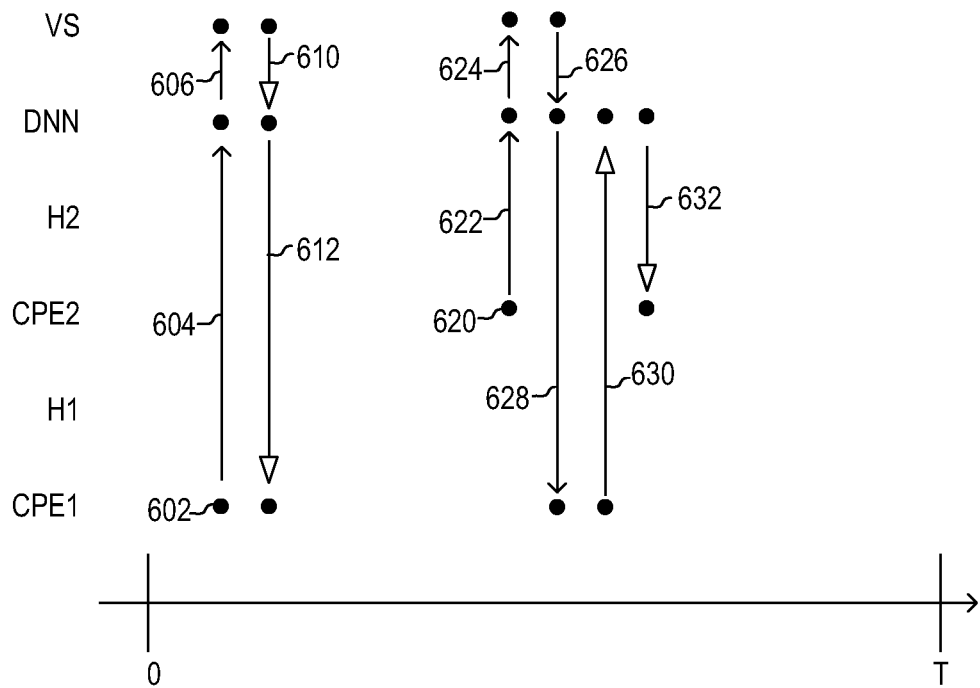
FIG. 6 illustrates limited-chain relay (LCR) distribution not involving a helper resource.
Figure 7:
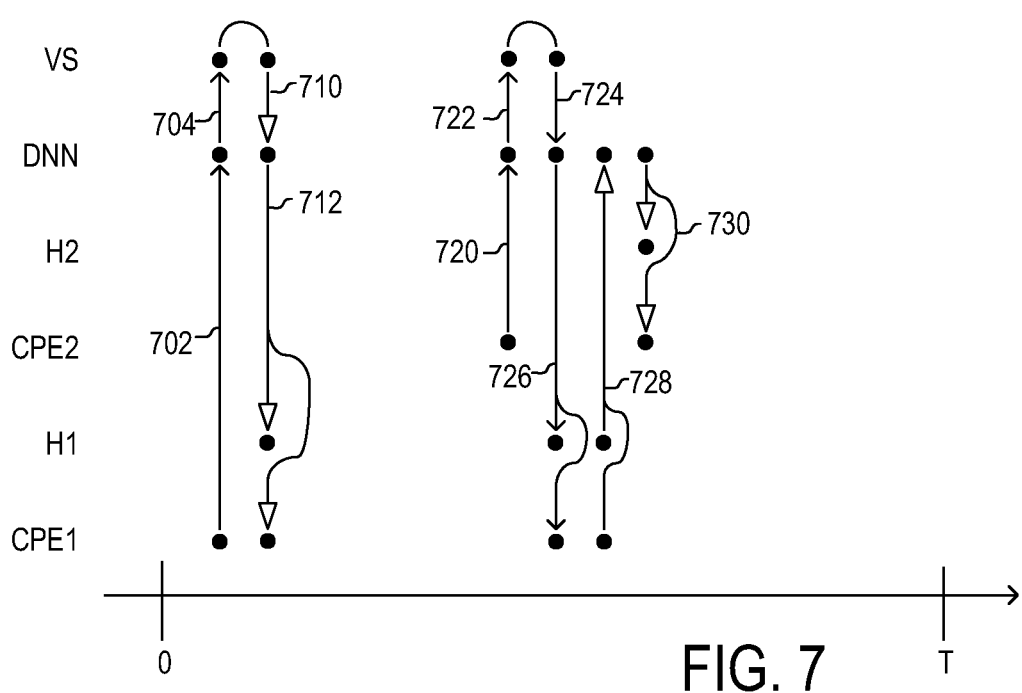
FIG. 7 illustrates LCR distribution involving a helper resource.

FIG. 6 and FIG. 7 illustrate exemplary LCR processing sequences for an environment in which no helpers are needed (FIG. 6) and an environment in which helpers are needed (FIG. 7). In both of these figures, lines terminating in open arrows represent message transfers while lines terminating in closed arrow heads represent content transfers. Sequence 600 as depicted in FIG. 6, CPE 1, which is the CPE of a first end user or first requestor, generates a content request at reference numeral 602 for a PMC. Content request 602 is the first content request for PMC that has occurred during the current LCR interval. The request is transmitted (604) by CPE 1, through an intervening network node (606), to a video server.

The video server recognizes the content request as the first request for the PMC within the LCR interval and responds by transmitting the PMC to CPE1 through the intervening network node as represented in FIG. 6 by reference numerals 610 and 612. At the end of the sequence depicted in FIG. 6, CPE1 has stored all or some of the PMC.

When a subsequent request for the multimedia content is issued by a second end user or requester (CPE2) at 620, the request is transmitted to the video server through the network node by messages 622 and 624. The video server may then determine that the current request is not the first request for the PMC. In this case, the video server will direct that CPEs involved to coordinate LCR distribution of content from one CPE to another.

As depicted in FIG. 6, the video server sends a message 626 and 628 to CPE2 through the intervening network node. Although FIG. 6 illustrate the video server coordinating the LCR distribution by sending messages 626 and 628, other embodiments may delegate the management of LCR distribution to the network node or to another network element not depicted in FIG. 6. Messages 626 and 628 inform the network node and the CPE that the current request has been served to at least one previous requestor during the current interval and indicate the identity of a previous requester, which is the immediately preceding requestor in some embodiments.

The network node determines from messages 628 and 626 that the second PMC request will be served to CPE2 by CPE1 without the use of a helper CPE. In this example, CPE1 begins to deliver the content to CPE2 through the intervening network node as represented by arrows 630 and 632. It will be appreciated by those skilled in networked data transfer that the second request for content is effectively served by the first requestor of the content. Moreover, the content delivery that occurs does not require use of network elements more upstream than access network 130.

In FIG. 7, a similar scenario is depicted for the case in which a helper is needed due to inadequate uplink bandwidth capacity. In FIG. 7, CPE1 issues a PMC request (702) that is the first PMC request of the current interval. The uplink capacity of CPE1 or another device that participates in content transfer is measured and it is determined that the bandwidth constraints are too severe. Method 700 addresses this scenario by identifying and selecting a helper, H1, from a pool of available helpers in response to the PMC request. Helper selection may be facilitated by selecting helpers based on availability factors, capacity factors, current or recent activity factors, and so forth.

The PMC request is routed by multimedia servers to the video server via the network node as represented by arrows 702 and 704. The video server responds to the PMC request and the helper selection by delivering content to the helper H1 as well as to CPE1 by arrows 710 and 712. Arrow 712 illustrates content transfer that occurs by multicasting to CPE1 and H1.

When a second request for the PMC is detected within the same LCR interval as the first intervals the depicted embodiment illustrates the second CPE, CPE2, transmitting the request to the video server using 720 and 722. The video server determines that this subsequent request for the PMC can be serviced by downstream elements since the content has been stored on CPE1 and H1. Accordingly, the video server sends a message to CPE1 and H1 via arrows 724 and 726 indicating the identity of the second requestor. CPE1 and H1 respond by cooperatively or jointly transmitting content (728) from CPE1 through to the network node and then delivering (730) the content to CPE2 and to a newly selected helper, H2. H2 represents the helper that will deliver content to a third requester of the CPE.

Figure 5:
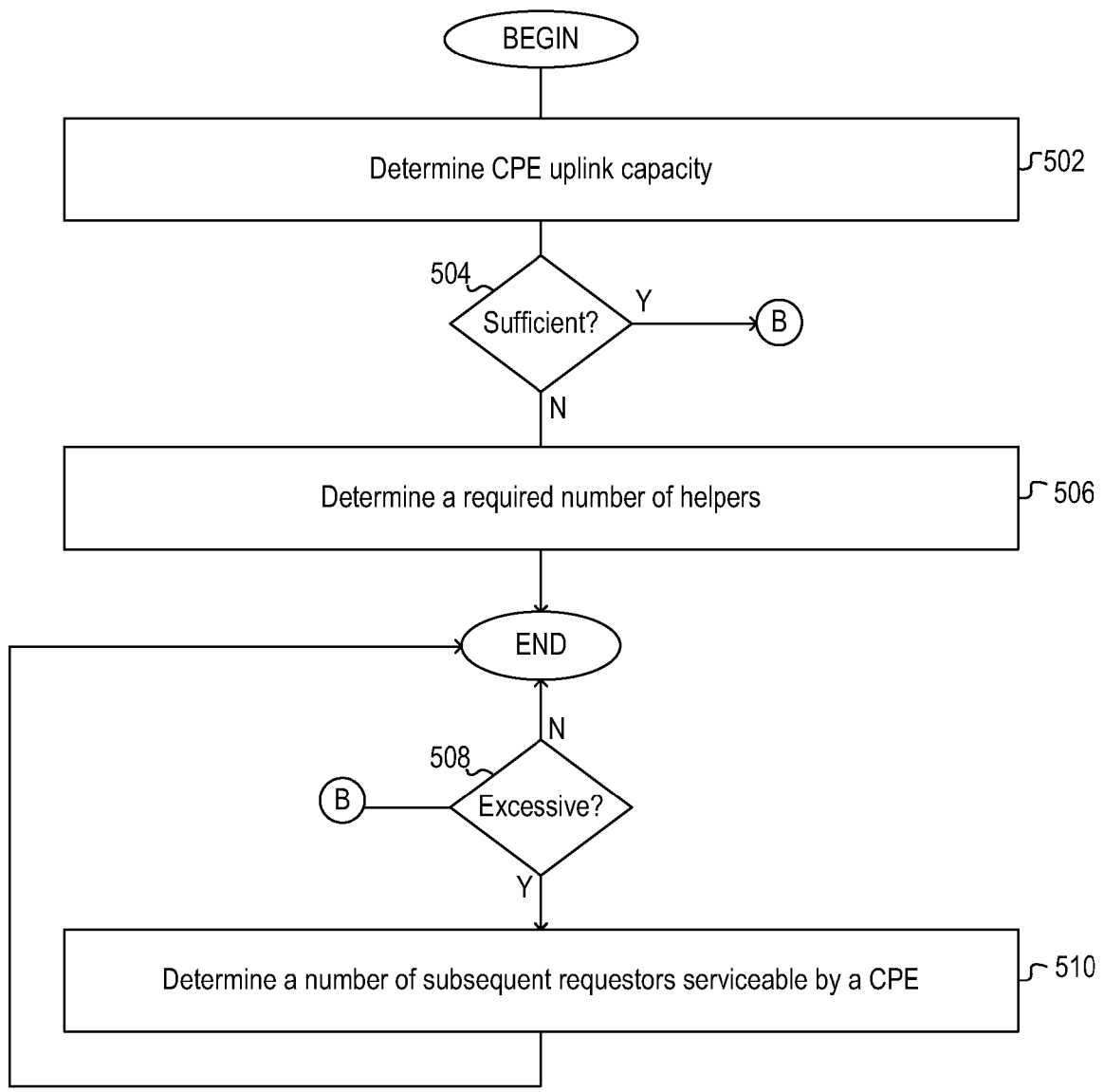
FIG. 5 is a flow diagram illustrating a method of evaluating an uplink of a CPE.

Turning now to FIG. 5, selected elements of a method 403 of evaluating the uplink capacity of a CPE in a multimedia content distribution network are presented. In the depicted embodiment of FIG. 5, uplink evaluation method 403 includes determining (block 502) an uplink capacity of CPEs and network nodes. If the uplink capacity is sufficient as depicted at block 504, the depicted embodiment then determines at block 508 whether the CPE uplink capacity is excessive, i.e., the uplink bandwidth capacity exceeds the bandwidth requirements needed to transfer content. In this case, the number of subsequent requesters that a single uplink can service is determined (block 510) and method 403 terminates. If the uplink capacity is not sufficient in block 504, method 403 includes determining (block 506) a required number of helpers to be used before exiting method 403.

Figure 8:
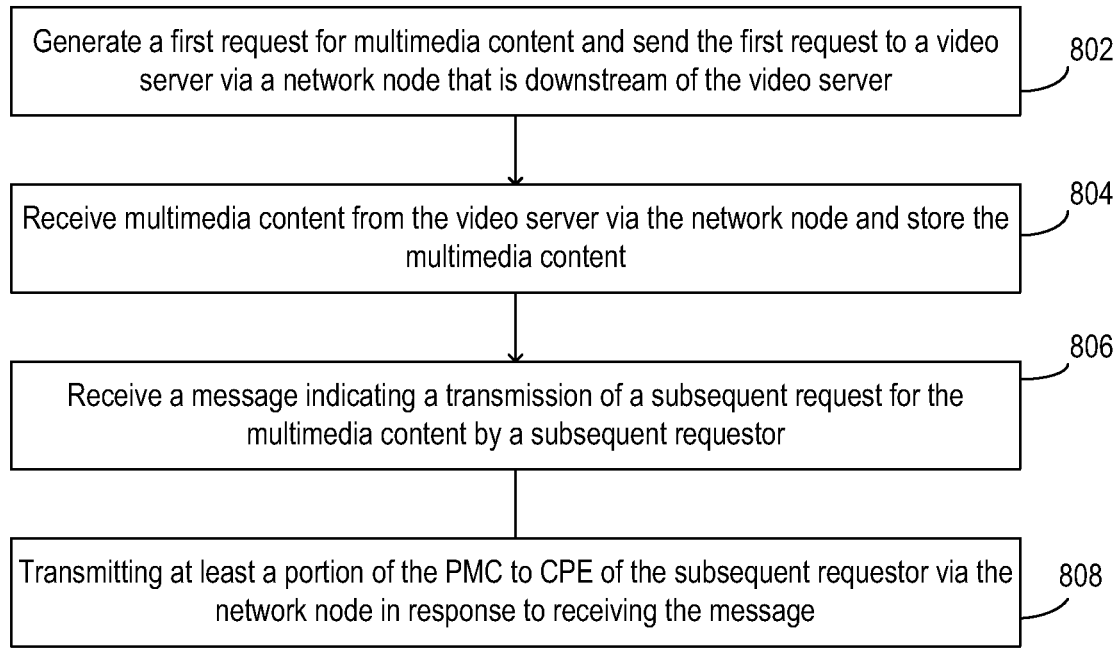
FIG. 8 illustrates selected elements of an embodiment of software suitable for use in a CPE of a multimedia content provider.

Turning now to FIG. 8, a flow diagram depicts selected elements of an embodiment of an LCR client application 800 executed by a CPE in a multimedia content distribution network 100. In the embodiment of method 800 as depicted in FIG. 8, method 800 includes generating (block 802) a first request for multimedia content and sending the first request to a video server through a network node 120. The network node 120 is downstream of the video server.

Figure 9:
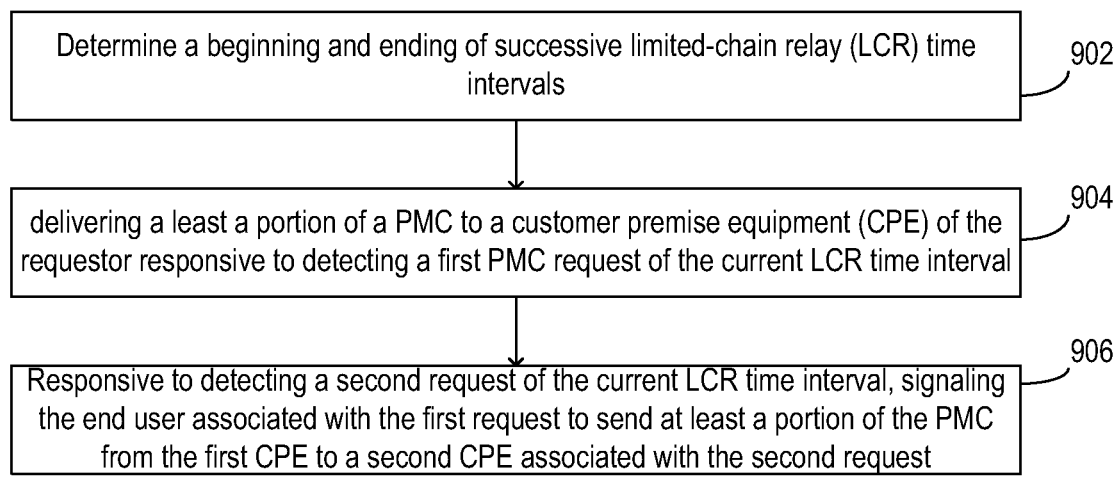
FIG. 9 illustrates selected elements of an embodiment of software suitable for use on a network node with hosting capability.

Method 800 as depicted further includes receiving (block 804) multimedia content from the video server via the network node 120 and storing the multimedia content. A message is then received (block 806) indicating that a subsequent request for the multimedia content is forthcoming. In block 808, at least a portion of the PMC is transmitted to the CPE of the subsequent requester via the network node 120 in response to receiving the message Turning to FIG. 9, a flow diagram depicts selected elements of a method 900 of content delivery. In the depicted embodiment method 900 includes determining (block 902) a beginning and ending of successive LCR time intervals. In block 904 as illustrated, method 900 includes delivering a least a portion of a PMC to a CPE of the requester in response to detecting the first PMC request or the current LCR timer intervals. Responsive (block 906) to detecting a second request of the current LCR time interval, method 900 includes signaling the end user associated with the first request to send at least a portion of the PMC from the first CPE to a second CPE associated with the second request.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of distributing multimedia content to end users, the method comprising:
   during any current interval in a sequence of intervals of predetermined maximum duration T:
   responding, by a video server, to a first request within the current interval for a program of multimedia content from a first requestor by delivering the program of multimedia content from the video server to first customer premise equipment of the first requestor;
   responsive to subsequent requests for the program of multimedia content from subsequent requestors occurring before termination of the current interval, routing at least a portion of the program of multimedia content from the first customer premise equipment to customer premise equipment corresponding to each of the subsequent requestors via a network node, wherein the network node includes a central office node; and
   terminating the current interval and beginning a new interval in response to satisfaction of a termination criterion selected from:
      a first criterion comprising receipt of more than N subsequent requests for the program of multimedia content during the current interval, wherein N is a predetermined threshold; and
      a second criterion comprising a duration of the current interval reaching the maximum duration T.

2. The method of claim 1, further comprising altering at least one of T and N in response to a frequency of satisfying the first criterion exceeding a specified threshold.

3. The method of claim 1, further comprising determining a value for at least one of T and N based on at least one of historical demand for the program of multimedia content and projected demand for the program of multimedia content.

4. The method of claim 1, wherein a connection between the first customer premise equipment and the network node includes a downlink and an uplink and wherein the method further comprises:
   determining an uplink bandwidth capacity;
   whenever the uplink bandwidth capacity is less than a predetermined threshold:
      determining a number of helper customer premise equipment needed to deliver content;
      identifying a selected helper customer premise equipment from a pool of available customer premise equipment;
      delivering at least a portion of the program of multimedia content from the video server to the selected helper customer premise equipment; and
      responding to subsequent requests for the program of multimedia content by causing at least a portion of the program of multimedia content to be delivered from at least some of the helper customer premise equipment.

5. The method of claim 4, wherein responding to the subsequent requests comprises selecting a number of subsequent helper customer premise equipment and delivering at least some of the program of multimedia content to the subsequent helper customer premise equipment.

6. The method of claim 4, further comprising maintaining a pool of potential helper customer premise equipment and selecting at least one helper customer premise equipment from the pool.

7. The method of claim 6, wherein selecting at least one helper customer premise equipment includes selecting at least one customer premise equipment based, at least in part, on an expected utilization of an uplink of the helper customer premise equipment.

8. The method of claim 4, wherein a maximum uplink capacity of the customer premise equipment is M and an uplink capacity required to deliver multimedia content is K and wherein the number of helper customer premise equipment is determined, at least in part, based on M and K.

9. The method of claim 8, wherein a minimum number of helper customer premise equipment is greater than or equal to (K/M)−1.

10. The method of claim 9, further comprising selecting a number of helper customer premise equipment exceeding the minimum number and wherein at least some of the selected helper customer premise equipment are used to provide redundancy in event of a failure of another helper customer premise equipment.

11. The method of claim 4, wherein delivering at least a portion of the program of multimedia content to helper customer premise equipment comprises multicasting the program of multimedia content to the helper customer premise equipment.

12. The method of claim 4, wherein at least one of the selected helper customer premise equipment is used as a helper customer premise equipment for multiple subsequent requests.

13. The method of claim 4, wherein the customer premise equipment store only a portion of the program of multimedia content.

14. The method of claim 4, wherein responding to the subsequent requests comprises:
   delivering a first portion of the program of multimedia content from at least some of the helper customer premise equipment of a previous requestor; and
   delivering a remaining portion of the program of multimedia content from the video server.

15. The method of claim 14, wherein delivering the remaining portion of the program of multimedia content from the video server comprises multicasting the remaining portion of the program of multimedia content.

16. The method of claim 1, wherein a connection between a second customer premise equipment and the network node includes a downlink and an uplink and wherein the method further comprises:
   when a bandwidth capacity of the uplink is greater than a predetermined threshold, responding to a plurality of subsequent requests for the program of multimedia content from subsequent requestors by delivering the program of multimedia content from the second customer premise equipment.

17. Customer premise equipment suitable for use in a multimedia content distribution network, the customer premise equipment comprising:
- a processor having access to a computer readable storage media;
- a network interface for receiving multimedia content; and
- a decoder for processing multimedia content received via the network interface;
- wherein the storage media includes limited chain relay application instructions, executable by the processor, that, when executed by the processor, cause the processor to perform limited chain relay application operations, comprising:
  - during any current interval in a sequence of intervals of predetermined maximum duration T:
  - sending a first request for multimedia content occurring during the current interval to a video server via a network node that is downstream of the video server and upstream of the customer premise equipment, wherein the network node comprises a central office node;
  - receiving the multimedia content from the video server via the network node;
  - responsive to receiving, before the current interval terminates, a subsequent request from a subsequent requestor for transmission of the multimedia content, transmitting the multimedia content from the customer premise equipment to a customer premise device of the subsequent requestor via the network node; and
  - terminating the current interval and beginning a new interval in response to satisfaction of a termination criterion selected from:
    - a first criterion comprising receipt of more than N subsequent requests for the program of multimedia content during the current interval, wherein N is a predetermined threshold; and
    - a second criterion comprising a duration of the current interval reaching the maximum duration T.

18. The customer premise equipment of claim 17, wherein an uplink capacity of a connection between the customer premise equipment and the network node is less than a predetermined capacity, and wherein the customer premise equipment is configured to respond to the subsequent request by selecting a helper from a pool of available helpers and delivering a portion of the program of multimedia content to the customer premise device and instructing the helper to send a different portion of the program of multimedia content to the customer premise device.

19. The customer premise equipment of claim 18, wherein selecting the helper includes selecting a wireless helper.

20. A central office node comprising processor and processor accessible storage, wherein, embedded in the storage is at least a portion of processor executable program instructions for a limited chain relay distribution application, the program instructions when executed by a processor, causing the processor to perform operations comprising:
- during any current limited chain relay interval of a plurality of successive limited chain relay time intervals:
  - responsive to detecting a first request of the current limited chain relay time interval, wherein the first request is from a first requestor for a program of multimedia content, delivering the program of multimedia content to a first customer premise equipment of the first requestor;
  - signaling the first customer premise equipment to store the program of multimedia content;
  - responsive to detecting a subsequent requests for the program of multimedia content occurring before a termination of the current limited chain relay time interval, wherein the subsequent requests are from subsequent requestors, signaling the first customer premise equipment to send at least a portion of the program of multimedia content to a second customer premise equipment of the second requestor;
  - signaling the second customer premise equipment to store the program of multimedia content; and
  - terminating the current interval and beginning a new interval in response to satisfaction of a termination criterion selected from:
    - a first criterion comprising receipt of more than N subsequent requests for the program of multimedia content during the current interval, wherein N is a predetermined threshold; and
    - a second criterion comprising a duration of the current interval reaching a maximum duration T.

* * * * *

UNITED STATES PATENT AND TRADEMARK OFFICE
CERTIFICATE OF CORRECTION

PATENT NO. : 8,589,993 B2  
APPLICATION NO. : 12/201826  
DATED : November 19, 2013  
INVENTOR(S) : Vaidyanathan Ramaswami et al.

Page 1 of 1

It is certified that error appears in the above-identified patent and that said Letters Patent is hereby corrected as shown below:

In the Claims

Column 16, lines 25-27 please correct Claim 9 as follows:

9. The method of claim 8, wherein a minimum number of helper customer premise equipment is greater than or equal to [[(KM)-1]] (K/M)-1.

Signed and Sealed this  
Fifteenth Day of April, 2014

Michelle K. Lee  
*Deputy Director of the United States Patent and Trademark Office*